Feb. 16, 1943.  E. A. MEYER  2,311,410

MOLDING RETAINING CLIP

Filed Nov. 6, 1940

Inventor
Engelbert A. Meyer
By Blackmore, Spencer & Flint
Attorneys

Patented Feb. 16, 1943

2,311,410

UNITED STATES PATENT OFFICE 2,311,410

MOLDING RETAINING CLIP

Engelbert A. Meyer, Detroit, Mich., assignor to General Motors Corporation, Detroit, Mich., a corporation of Delaware Application November 6, 1940, Serial No. 364,591

11 Claims. (Cl. 189—83)

This invention relates to clips and has particular reference to a clip used to retain a molding on an object such as the body of an automobile.

The object of the invention is to construct a clip which, in addition to retaining the molding in place, will be immovable when it is once secured to the body. To render the clip immovable, the body is provided with two adjacent openings in line with and underneath the molding, and in one opening there is positioned a projection formed on a tail attached to the head of the clip. Through the other opening a fastening means is passed which also passes through an opening in the head of the clip and by turning the end of the fastening means over onto the body of the clip is rigidly and permanently held in place. The tail of the clip fits entirely over the opening in which the projection is received and the securing means tightly closes the second opening in the body. The two openings are therefore tightly closed to prevent the access of water.

Figure 1:
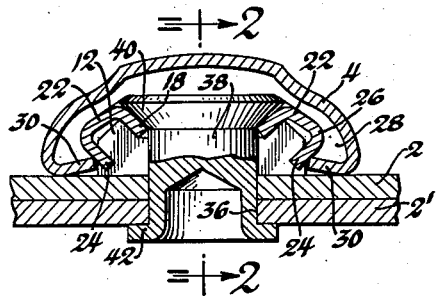
Figure 1 is a sectional view through the clip and the molding, taken substantially on the line 1—1 of Figure 2.

Referring to the drawing, the numeral 2 indicates any suitable object such as the body of an automobile to which the molding strip 4 is to be attached. In the constructin shown in Figures 1 and 2, the molding is shown applied at a place where the adjacent parts of the automobile body overlap the metal 2', indicating the second part of the automobile body.

The clip of the invention is indicated as a whole at 6 and comprises the head or retaining part 8 and the tail part 10. The head 8 has the lateral walls 12 and 14 and the relatively flat top 16 which is provided with an opening 18, the sides of which are beveled as indicated at 20. The sides 12 and 14 are at right angles to the top 16.

Between the sides 12 and 14 the ends of the top 16 are bent to form lateral wings 22 which are generally of V shape in cross section. The free ends 24 of the wings project inwardly between the sides 12 and 14 and the apex 26 of the V projects into the corner 28 of the molding formed by the bottom flange 30 and the side of the molding. The end of the flange 30 of the molding projects against the edges of the walls 12 and 14 and against the inclined part of the free end 24 of the wings as shown in Figure 1.

The tail 10 of the clip projects at right angles to the side 14 and is provided with a projection 32 which is formed by pressing a part of the metal from the plane of the tail. This projection 32 is adapted to fit into an opening 34 formed in the body 2 of the automobile and prevents the clip from turning or moving after the clip 6 has been applied.

Figure 2:
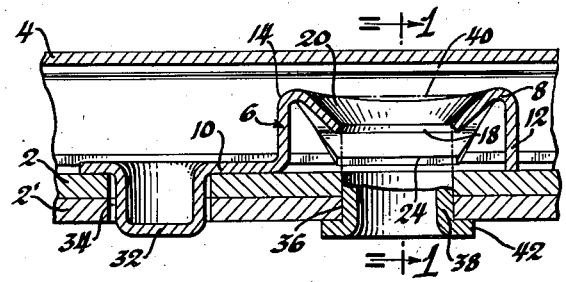
Figure 2 is a sectional view on the line 2—2 of Figure 1, showing a part of the fastening rivet removed better to illustrate the construction.
Figure 3:
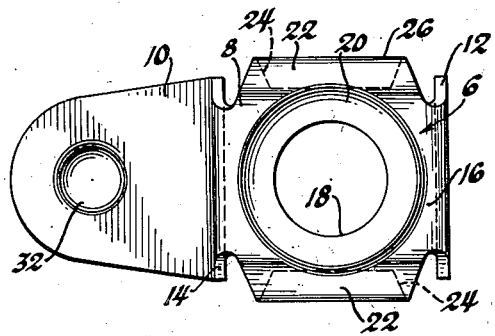
Figure 3 is a plan view of the clip.
Figure 4:
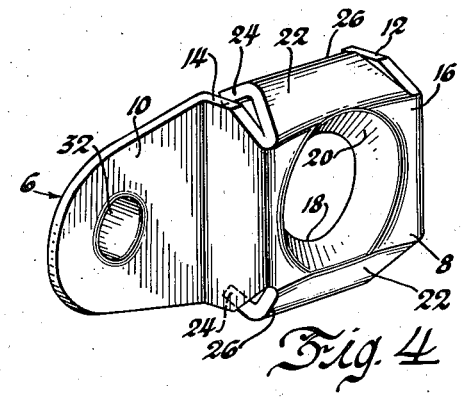
Figure 4 is a perspective view of the clip.

The body is provided with a second opening 36 which is positioned under the opening 18 in the head 6. A rivet or other suitable fastening means 38 having a beveled or chamfered head 40 passes through the openings 18 and 36 and has its inner end turned over as indicated at 42 rigidly to hold the clip on the body 2. With the projection 32 in the opening 34, and the fastening means 38 secured as shown in Figures 1 and 2, the clip is permanently and immovably held in place on the body 2.

The molding 4 is applied by forcing it over the apex 26 of the wings 22. There is sufficient yield in the metal of the molding to enable the flanges 30 to snap over the wings 22.

Figure 5:
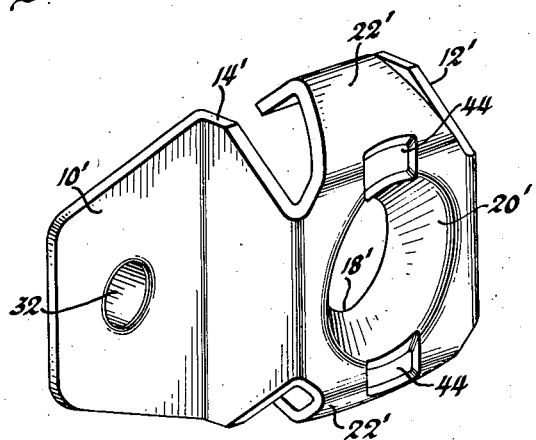
Figure 5 is a perspective view similar to Figure 4 of a slightly modified form of clip.

Figure 5 shows a modified form of clip in which the corresponding parts are designated by the same numeral but with a prime applied. The wings 22' of the clip are much longer and the clip is larger and because of the increased amount of metal used, it may be desirable to apply to the clip the openings 44 to give some additional flexibility to the wings 22' in order that the flanges 30 on the molding side may easily be snapped into place.

I claim:

1. In a clip for securing a molding to the surface of an object, a molding retaining part, a flat tail extending away from the retaining part and being in contact with the said surface of the object covered by the molding, and cooperating means on the tail and the object to prevent movement of the clip.

2. In a clip for securing a molding to the surface of an object having a plurality of openings, a molding retaining part secured at one opening in the object, a flat tail extending away from the retaining part and being in contact with the said surface of the object covered by the molding, and means on the tail to engage in a second opening in the object to prevent movement of the clip.

3. In a clip for securing a molding to the surface of an object, a molding retaining part secured at an opening in the object, a flat tail extending away from the retaining part and being in contact with the said surface of the object covered by the molding, and a projection on the tail extending toward the object, said object having a second opening, said projection engaging in the second opening to prevent movement of the clip.

4. In a clip for securing a molding to the surface of an object, a head on the clip forming a retaining part for the molding, said head having an opening for the reception of a fastening device, said object having an opening in substantial alignment with the opening in the head, fastening means passing through the openings and securing the clip to the object, a flat tail extending away from the retaining part and being in contact with the said surface of the object covered by the molding, and interengaging means on the tail and object to prevent movement of the clip relative to the object.

5. In a clip for securing a molding to the surface of an object, a head on the clip forming a retaining part for the molding, said head having a countersunk opening for the reception of a fastening device, said object having an opening in substantial alignment with the opening in the head, fastening means having a beveled head to fit in the countersunk opening in the head and passing through the openings and securing the clip to the object, a flat tail extending away from the retaining part and being in contact with the said surface of the object covered by the molding, and interengaging means on the tail and object to prevent movement of the clip relative to the object.

6. In a clip for securing a molding to the surface of an object, a head on the clip forming a retaining part for the molding, said head having an opening for the reception of a fastening device, said object having an opening in substantial alignment with the opening in the head, fastening means passing through the openings and securing the clip to the object, a flat tail extending away from the retaining part and being in contact with the said surface of the object covered by the molding, said object having a second opening, and a projection on said tail received in said second opening to prevent movement of the clip relative to the object.

7. In a clip for securing a molding to the surface of an object, a retaining part having side walls and a top, the bottoms of said walls contacting the object when the clip is in place, wings extending from the top and adapted to be engaged by the molding when the molding is in place, means to secure the retaining part to the object, a tail extending away from one of the side walls and being in contact with the said surface of the object covered by the molding, and interconnecting means on the tail and object to prevent movement of the clip relative to the object.

8. In a clip for securing a molding to the surface of an object, a retaining part having side walls and a top, the bottoms of said walls contacting the object when the clip is in place, wings extending from the top and adapted to be engaged by the molding when the molding is in place, means to secure the retaining part to the object, a tail extending away from one of the side walls and being in contact with the said surface of the object covered by the molding, a projection on the tail, said projection extending into an opening on the object to prevent movement of the clip relative to the object.

9. In a clip for securing a molding to the surface of an object, a retaining part having side walls and a top, the bottoms of said walls contacting the object when the clip is in place, wings extending from the top and adapted to be engaged by the molding when the molding is in place, said top having an opening, there being a mating opening in the object, a rivet received in the openings and securing the retaining part to the object, means to secure the retaining part to the object, a tail extending away from one of the side walls and being in contact with the said surface of the object covered by the molding, and interconnecting means on the tail and object to prevent movement of the clip relative to the object.

10. In a clip for securing a molding to the surface of an object, a retaining part having side walls and a top, the bottoms of said walls contacting the object when the clip is in place, wings extending from the top and adapted to be engaged by the molding when the molding is in place, said top having an opening having a beveled edge, there being a mating opening in the object, a rivet having a beveled head received in the beveled opening and passing through the opening in the object and secured to the object to hold the retaining part in place, a tail extending away from one of the side walls and being in contact with the said surface of the object covered by the molding, and interconnecting means on the tail and object to prevent movement of the clip relative to the object.

11. In a clip for securing a molding to the surface of an object, a retaining part having side walls and a top, the bottoms of said walls contacting the object when the clip is in place, wings extending from the top and adapted to be engaged by the molding when the molding is in place, said top having an opening at the end of each wing to give greater flexibility to the wings, means to secure the retaining part to the object, a tail extending away from one of the side walls and being in contact with the said surface of the object covered by the molding, and interconnecting means on the tail and object to prevent movement of the clip relative to the object.

ENGELBERT A. MEYER.